United States Patent
Zimet et al.

(10) Patent No.: US 9,245,104 B2
(45) Date of Patent: Jan. 26, 2016

(54) METHOD AND APPARATUS FOR PROVIDING SECURITY WITH A MULTI-FUNCTION PHYSICAL DIAL OF A COMMUNICATION DEVICE

(71) Applicant: HERE Global B.V., Veldhoven (NL)

(72) Inventors: Martha Zimet, Santa Cruz, CA (US); Vijayshankar Subramanian, Sunnyvale, CA (US); Kris Efland, Palo Alto, CA (US)

(73) Assignee: HERE Global B.V., Veldhoven (NL)

( * ) Notice: Subject to any disclaimer, the term of this patent is extended or adjusted under 35 U.S.C. 154(b) by 57 days.

(21) Appl. No.: 14/152,670

(22) Filed: Jan. 10, 2014

(65) Prior Publication Data

US 2015/0199503 A1     Jul. 16, 2015

(51) Int. Cl.
  *G06F 21/34*     (2013.01)
  *G06F 21/62*     (2013.01)
(52) U.S. Cl.
  CPC ............ *G06F 21/34* (2013.01); *G06F 21/6218* (2013.01)
(58) Field of Classification Search
  CPC ..... G06F 21/6218; G06F 21/53; G06F 21/83; G06F 21/34; G06F 3/0488
  USPC .............................................. 726/2, 9, 29, 34
  See application file for complete search history.

(56) References Cited

U.S. PATENT DOCUMENTS

| | | |
|---|---|---|
| 6,741,160 B1 | 5/2004 | Dawson et al. |
| 2001/0021980 A1 | 9/2001 | Linden et al. |
| 2008/0165144 A1 | 7/2008 | Forstall et al. |
| 2009/0165682 A1* | 7/2009 | Cleveland et al. .............. 109/23 |
| 2011/0181389 A1 | 7/2011 | Ma |
| 2013/0036377 A1 | 2/2013 | Colley |

FOREIGN PATENT DOCUMENTS

| | | |
|---|---|---|
| EP | 2402849 A1 | 1/2012 |
| EP | 2490115 A1 | 8/2012 |

OTHER PUBLICATIONS

"iPod: How to use the Screen Lock", Retrieved on Feb. 20, 2014, Webpage available at : http://support.apple.com/kb/HT1350.
"Shortcut Wheel Screen Lock", Appszoom, Retrieved on Feb. 20, 2014, Webpage available at : http://www.appszoom.com/android_applications/tools/shortcut-wheel-screen-lock_glxei.html.

(Continued)

*Primary Examiner* — Kambiz Zand
*Assistant Examiner* — Noura Zoubair
(74) *Attorney, Agent, or Firm* — Alston & Bird LLP

(57) ABSTRACT

A method, apparatus and computer program product are provided to facilitate controlled access to a communication device in accordance with predefined security levels in an independent manner that does not require a network connection. In the context of a method, a combination lock code is associated with a predefined security level for the communication device. The method also includes receiving input indicative of rotation of a multi-function physical dial carried by the communication device. The method also determines whether the input corresponds to the combination lock code and, in an instance in which the input does correspond to the combination lock code, permits access to the communication device in a manner consistent with the predefined security level.

20 Claims, 4 Drawing Sheets

(56) References Cited

OTHER PUBLICATIONS

"Tip: Add a Screen Lock Button to Your iphone and ipad Layouts", FileMaker, Retrieved on Feb. 20, 2014, Webpage available at : http://help.filemaker.com/app/answers/detail/a_id/9312/~/tip%3A-add-a-screen-lock-button-to-your-iphone-and-ipad-layouts.

"Master Lock Combination Instructions", eHow, Retrieved on Feb. 20, 2014, Webpage available at : http://www.ehow.com/how_6496913_master-lock-combination-instructions.html.

"NX10, Blue Line Along the Focus Ring Very Pleasant", Samsung, Retrieved on Feb. 20, 2014, Webpage available at : http://samsungcamera.com/nx10-blue-line-along-the-focus-ring-very-pleasant/.

"Canon PowerShot S110 Digital Camera", B&H, Retrieved on Feb. 20, 2014, Webpage available at : http://www.bhphotovideo.com/c/product/889962-Reg/Canon_PowerShot_S110_Digital_Camera.html.

"X-10™ High Security Locks", Kaba Mas, Retrieved on Feb. 20, 2014, Webpage available at : http://www.kaba-mas.com/Kaba-Brand/Products/553040/x-10.html.

"X-10™ & CDX-10™, Type 1F High Security Electronic Locks", Kaba Mas, Retrieved on Feb. 20, 2014, 7 pages.

"Lock Spin", Android Apps on Google Play, Retrieved on Feb. 20, 2014, Webpage available at : https://play.google.com/store/apps/details?id=au.edu.vic.avila.lockspin&hl=en.

Lock Spin—Android Apps on Google Play [online] [retrieved Nov. 15, 2013]. Retrieved from the Internet: https://play.google.com/store/apps/details?id=au.edu.vic.avila.lockspin&hl=en. (date Jan. 17, 2013) 2 pages.

How to Use Your iPod Screen Lock (iPods: Getting Started) Videojug (video) [online] [retrieved Nov. 15, 2013]. Retrieved from the Internet: http://www.videojug.com/film/how-to-use-your-ipod-screen-lock. (undated) 2 pages.

Self-Charging Cell Phone Screens Coming Soon [online] [retrieved Jul. 15, 2015]. Retrieved from the Internet: < http://spectrum.ieee.org/tech-talk/green-tech/solar/selfcharging-cell-phone-screens-coming-soon>. (dated Jun. 12, 2013) 2 pages.

Creating Light-Aware User Interfaces (windows) [online] [retrieved Jul. 15, 2015]. Retrieved from the Internet: > https://web.archive.org/web/20120507042001/http://msdn.microsoft.com/en-us/library/windows/desktop/dd31897(v=vs.85).aspx> (dated May 7, 2012) 3 pages.

Enabling the Ambient Light Sensor (ALS) in Desktop Application for Ultrabook™ on W . . . [online] [retrieved Jul. 13, 2015]. Retrieved from the Internet: http://software.intel.com/en-us/articles/ambient-light-sensor. (dated Sep. 7, 2012) 3 pages.

* cited by examiner

METHOD AND APPARATUS FOR PROVIDING SECURITY WITH A MULTI-FUNCTION PHYSICAL DIAL OF A COMMUNICATION DEVICE

TECHNOLOGICAL FIELD

An example embodiment of the present invention relates generally to the provision of security for a communication device and, more particularly, to a method, apparatus and computer program product for providing security for a communication device utilizing a multi-function physical dial.

BACKGROUND

Communication devices are utilized for a wide variety of purposes including communication with other devices, access to network services, such as internet services, or the like. Communication devices may be utilized by a wide variety of users ranging from relative novices or other casual users who utilize a communication device for its more basic functionality to administrators or other more advanced users who may be involved with programming the communication device so as to define or enhance its functionality.

Security levels may therefore be defined for a communication device in order to provide controlled access to various functions and features of the communication device. For example, a relatively low security level may be associated with novice users of the communication device to permit the novice users to utilize the more basic functionality of the communication device, but to prevent access by the novice users to more advanced functionality, such as by preventing novice users from loading additional applications or otherwise modifying the applications executed by the communication device. In contrast, a relatively high security level may be associated with more advanced users, such as administrators, programmers or the like, to permit the more advanced users to load additional applications onto the communication device or to otherwise modify the performance of the communication device. For example, the security level associated with a more advanced user of a communication device may permit access to the application programming interfaces (APIs) and software development kits (SDKs) of the communication device so as to permit the more advanced users to upload applications written utilizing the APIs and SDKs of the communication device in order to modify the functionality of the communication device.

The various security levels of a communication device may be associated with respective codes that may be entered by a user in order to gain the desired access to the communication device. For example, the codes associated with the different security levels may be stored by a network device, such as by being stored within cloud storage. As such, a user may enter a code, such as via the keypad, a touchscreen or other software-based user interface. The code entered by the user may be transmitted by the communication device to the network for a comparison with predefined codes associated with the various security levels. The network may, in turn, inform the communication device as to whether the code entered by the user matches the code for a respective security level and, if so, the communication device may grant access to the user of the various privileges associated with the respective security level. This process requires the communication device to have a network connection such that in instances in which the communication device is offline or otherwise does not have a network connection, the user is unable to be verified in accordance with the various security levels and, as such, is unable to take advantage of the various privileges associated with the respective security level until the communication device secures a network connection and the code entered by the user is able to be verified.

BRIEF SUMMARY

A method, apparatus and computer program product are provided in accordance with an example embodiment in order to facilitate controlled access to a communication device in accordance with predefined security levels in an independent manner that does not require a network connection. As such, a user may be granted access to the communication device in a manner consistent with a predefined security level in an instance in which a user enters an appropriate code even if the communication device is offline or otherwise does not have a network connection. Moreover, the method, apparatus and computer program product of an example embodiment provide for entry of the code by the user in a manner that is intuitive and that provides the feedback anticipated by the user during entry of the code without requiring the communication device to be physically modified.

In an example embodiment, a method is provided that includes associating a combination lock code with a predefined security level for a communication device. The method of this example embodiment also includes receiving input indicative of rotation of a multi-function physical dial carried by the communication device. In this example embodiment, the method also determines whether the input corresponds to the combination lock code and, in an instance in which the input does correspond to the combination lock code, permits access to the communication device in a manner consistent with the predefined security level.

In an instance in which the input fails to correspond to the combination lock code, the method of an example embodiment may also cause another function to be performed by the electronic device based upon the input. The method may associate the combination lock code with a predefined security level by determining the combination lock code based upon a predefined identifier associated with the communication device. In an example embodiment, the method may determine the combination lock code by mapping the predefined identifier to the combination lock code with a hash function. The method of an example embodiment may permit access to the electronic device by permitting an application written using an application programming interface (API) or a software development kit (SDK) of the communication device to be uploaded to the communication device. In example embodiment, the communication device may be capable of being alternately communicably connected to or disconnected from a network. In this example embodiment, the method may determine whether the input corresponds to the combination lock code while the communication device is communicably disconnected from the network. The method of an example embodiment may also include causing information regarding the combination lock code to be displayed.

In another example embodiment, an apparatus is provided that includes at least one processor and at least one memory including computer program code with the at least one memory and the computer program code being configured to, with the processor, cause the apparatus to at least associate a combination lock code with a predefined security level for a communication device. The at least one memory and the computer program code are also configured to, with the processor, cause the apparatus of this example embodiment to receive input indicative of rotation of a multi-function physical dial carried by the communication device. The at least one memory and the computer program code are also configured to, with the processor, cause the apparatus of the example embodiment to determine whether the input corresponds to the combination lock code and, in an instance in which the input does correspond to the combination lock code, to permit access to the communication device in a manner consistent with a predefined security level.

The at least one memory and the computer program code may be further configured to, with the processor, cause the apparatus of an example embodiment to cause another function to be performed by the communication device based upon the input in an instance in which the input fails to correspond to the combination lock code. The at least one memory and the computer program code may be configured to, with the processor, cause the apparatus of an example embodiment to associate the combination lock code with a predefined security level by determining the combination lock code based upon a predefined identifier associated with the communication device. The at least one memory and the computer program code may be configured to, with the processor, cause the apparatus of an example embodiment to determine the combination lock code by mapping the predefined identifier to the combination lock code with a hash function.

The at least one memory and the computer program code may be configured to, with the processor, cause the apparatus of an example embodiment to permit access to the communication device by permitting an application written using an application programming interface (API) or a software development kit (SDK) of the communication device to be uploaded to the communication device. In an example embodiment, the communication device is capable of being alternately communicably connected to or disconnected from a network. In this example embodiment, the at least one memory and the computer program code may be configured to, with the processor, cause the apparatus to determine whether the input corresponds to the combination lock code while the communication device is communicably disconnected from the network. The at least one memory and the computer program code may be further configured to, with the processor, cause the apparatus of an example embodiment to cause information regarding the combination lock code to be displayed.

In a further example embodiment, a computer program product is provided that includes at least one non-transitory computer-readable storage medium having computer-executable program code portions stored therein with the computer-executable program code portions including program code instructions for associating the combination lock code with a predefined security level for a communication device. The computer-executable program code portions of this example embodiment also include program code instructions for receiving input indicative of rotation of a multi-function physical dial carried by the communication device. The computer-executable program code portions of this example embodiment further include program code instructions for determining whether the input corresponds to the combination lock code and, in an instance in which the input does correspond to the combination lock code, program code instructions for permitting access to the communication device in a manner consistent with the predefined security level.

The computer-executable program code instructions of an example embodiment may further include program code instructions for, in an instance in which the input fails to correspond to the combination lock code, causing another function to be performed by the communication device based upon the input. The program code instructions for associating the combination lock code with a predefined security level may include program code instructions for determining the combination lock code based upon a predefined identifier associated with the communication device. For example, the program code instructions for determining the combination lock code may include program code instructions for mapping the predefined identifier to the combination lock code with a hash function. The program code instructions for permitting access to the communication device may include program code instructions permitting an application written using an application programming interface (API) or a software development kit (SDK) of the communication device to be uploaded to the communication device. The communication device of an example embodiment may be capable of being alternately communicably connected to or disconnected from a network. In this example embodiment, the program code instructions for determining whether the input corresponds to the combination lock code may be configured to execute while the communication device is communicably disconnected from the network.

In yet another example embodiment, an apparatus is provided that includes means for associating a combination lock code with a predefined security level for a communication device. The apparatus of this example embodiment also includes means for receiving input indicative of rotation of a multi-function physical dial carried by the communication device. The apparatus of this example embodiment also includes means for determining whether the input corresponds to the combination lock code and means, in an instance in which the input does correspond to the combination lock code, for permitting access to the communication device in a manner consistent with the predefined security level.

BRIEF DESCRIPTION OF THE DRAWINGS

Figure 1:
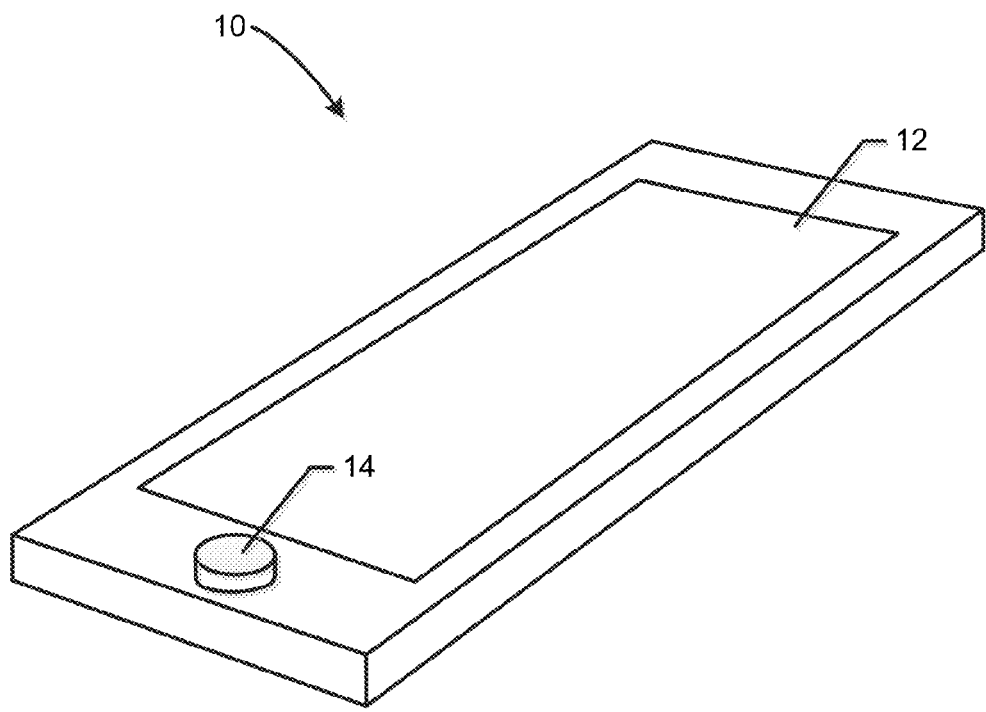
Figure 2:
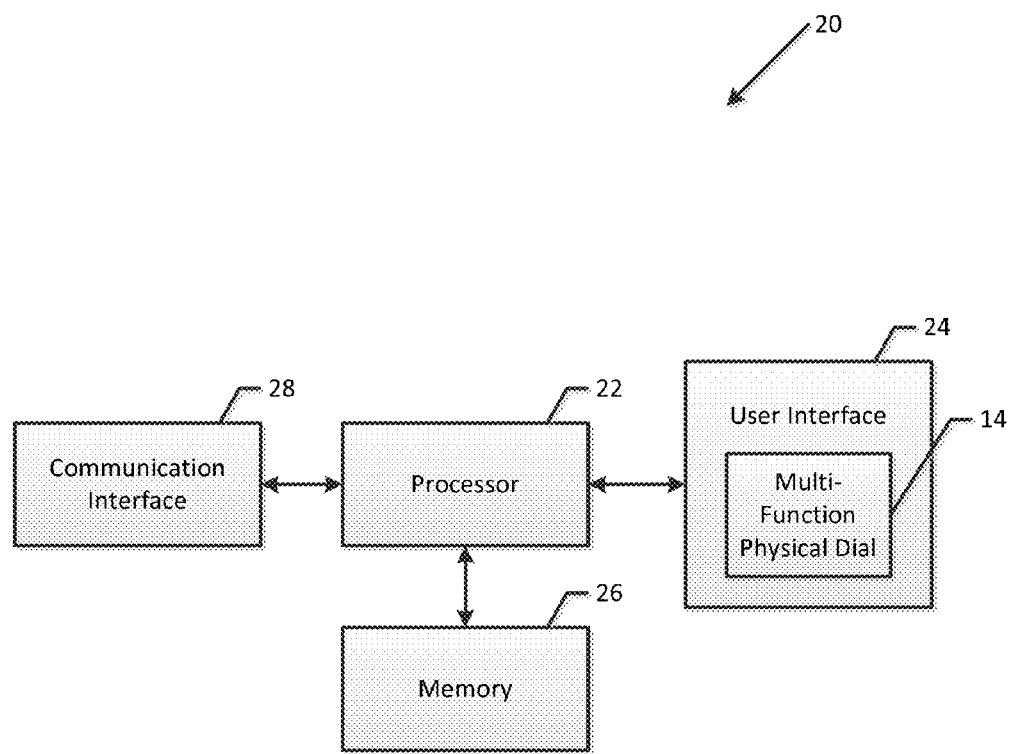
Figure 3:
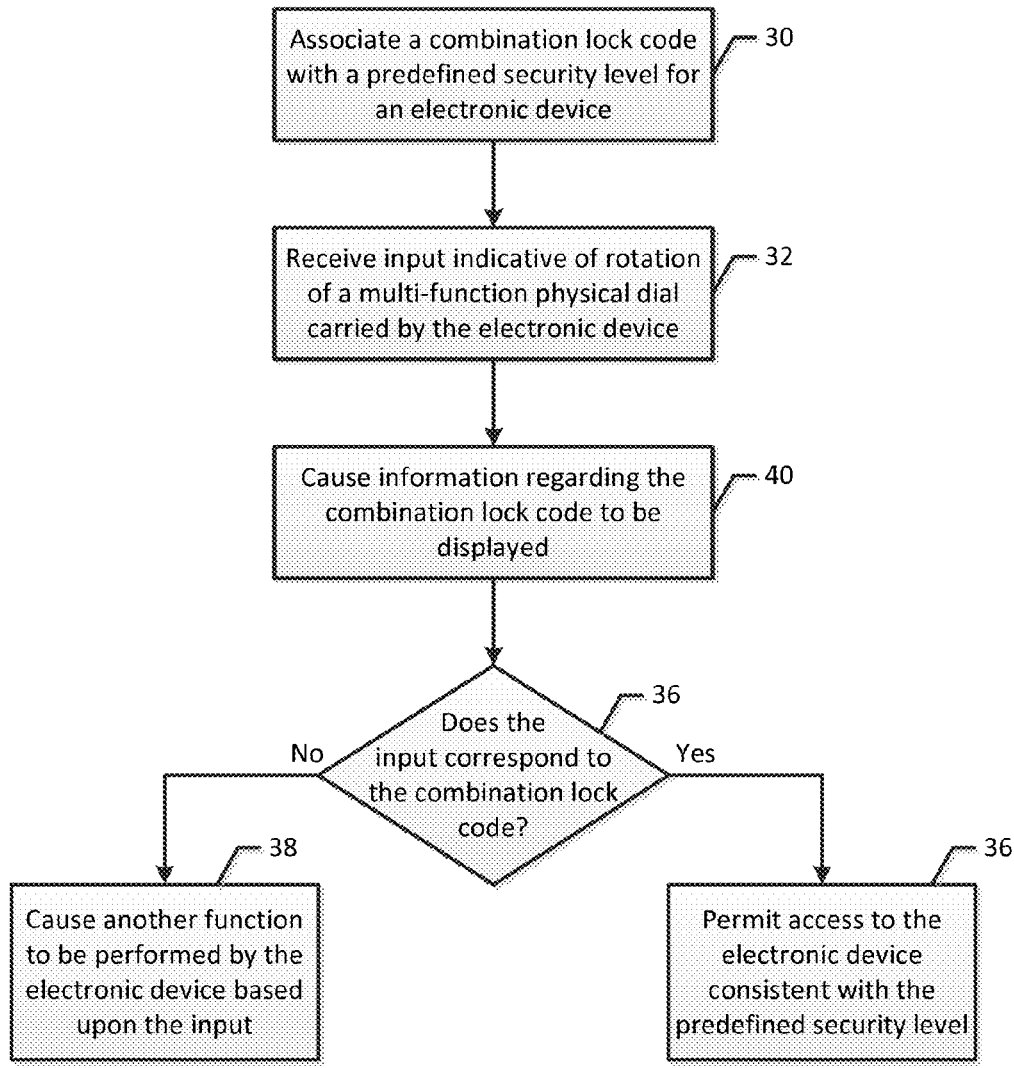
Figure 4:
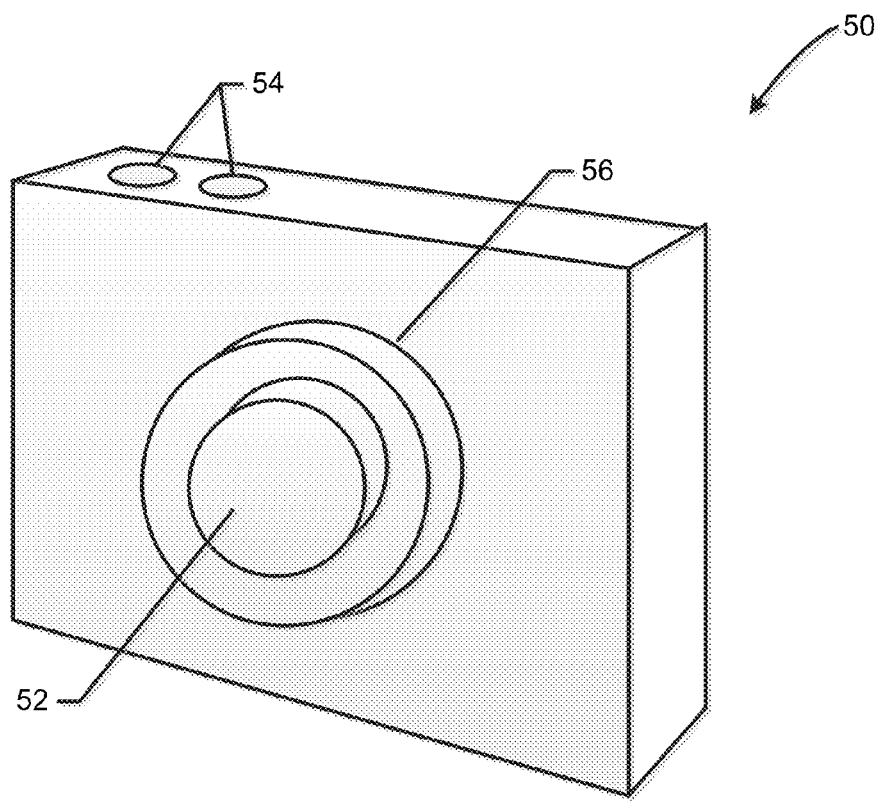

Having thus described example embodiments of the invention in general terms, reference will now be made to the accompanying drawings, which are not necessarily drawn to scale, and wherein:

FIG. 1 is a perspective view of a communication device having a multi-function physical dial that may be configured in accordance with an example embodiment of the present invention;

FIG. 2 is block diagram of an apparatus that may be embodied by or associated with the communication device and may be specifically configured in accordance with an example embodiment of the present invention;

FIG. 3 is a flowchart illustrating operations performed, such as by the apparatus of FIG. 2, in accordance with an example embodiment of the present invention; and FIG. 4 is a perspective view of a communication device having a multi-function physical dial that may be configured in accordance with another example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus, and computer program product are provided in accordance with an example embodiment in order to provide for controlled access to a communication device based upon predefined security levels for the communication device. As described below, the method, apparatus, and computer program product may utilize a multi-function physical dial carried by the communication device in order to enter a combination lock code that may, in turn, be associated with a predefined security level in order to gain access to the privileges associated with the respective security level of the communication device. By utilizing a multi-function physical dial to enter the combination lock code, a user may enter the combination lock code in an intuitive manner and in a manner that provides the anticipated feedback to the user so as to increase the likelihood that the user properly enters the desired combination lock code. Moreover, the method, apparatus and computer program product of an example embodiment may permit the combination lock code to be entered and may determine whether the combination lock code satisfies a predefined security level while the communication device is offline or otherwise without a network connection.

The method, apparatus, and computer program product of an example embodiment may be employed in conjunction with a wide variety of communication devices. As shown in FIG. 1, for example, a communication device 10 may be embodied as a mobile terminal, such as a personal digital assistant (PDA), mobile telephone, smartphone, companion device, e.g., a smart watch, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. As shown in FIG. 1, the communication device of this example embodiment may include a display 12, such as a touch display, for providing output to the user and optionally receiving input from the user. Additionally, the communication device may include a multi-function physical dial 14, such as a selector or knob, for permitting entry of user input for various purposes, such as by providing user input in conjunction with various applications. In this regard, the multi-function physical dial may be configured to rotate clockwise, counterclockwise or both relative to the remainder of the communication device. The multi-function physical dial of an example embodiment may rotate over multiple revolutions in order to span multiple orders of resolution without losing precision.

Regardless of the manner in which the communication device 10 is instantiated, the communication device may include or otherwise be associated with an apparatus 20 configured to provide for controlled access to the communication device in a manner consistent with one or more predefined security levels based upon a combination lock code input by the user's rotation of the multi-function physical dial 14. As shown in FIG. 2, the apparatus may include or otherwise be in communication with a processor 22, a memory device 26, a user interface 24 and a communication interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by the communication device 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., the client device 10 and/or a network entity) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 may also include a user interface 24. The user interface, such as the display 12, may be in communication with the processor 22 to provide output to the user and, in some embodiments, to receive an indication of a user input. In example embodiments, the user interface includes the multi-function physical dial 14 for receiving user input for various purposes, as described below. In some embodiments, the user interface may also include a keyboard, a mouse, a joystick, touch areas, soft keys, one or more microphones, a plurality of speakers, or other input/output mechanisms. In an example embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 26, and/or the like).

The apparatus 20 of the illustrated embodiment may also include a communication interface 28 that may be any means such as a device or circuitry embodied in either hardware or a combination of hardware and software that is configured to receive and/or transmit data from/to a communications device in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Referring now to FIG. 3, the operations performed in accordance with an example embodiment in order to control access to various features and functions of a communication device 10 pursuant to one or more predefined security levels are illustrated. As shown in block 30 of FIG. 3, the apparatus 20 may include means, such as the processor 22, the memory 26 or the like, for associating a combination lock code with a predefined security level for the communication device. The communication device of an example embodiment may be configured to have a plurality of different predefined security levels and a different combination lock code may be associated with each of the different predefined security levels.

The combination lock code that is associated with a predefined security level may be defined in various manners. In an example embodiment, the apparatus 20, such as the processor 22 or the like, may be configured to associate the combination lock code with a predefined security level by determining the combination lock code based upon a predefined identifier associated with, e.g., assigned to, the communication device 10. For example, the apparatus, such the processor or the like, may determine the combination lock code by mapping the predefined identifier, such as the international mobile equipment identity (IMEI) or other unique identifier associated with the communication device, to the combination lock code with a hash function. In this regard, the IMEI is a unique number (from among the population of mobile equipment) used to identify the communication device with no permanent or semi-permanent relation to the user. Additionally, a hash function is any function that maps data of variable length to a fixed length. The combination lock code may be determined in advance of any user input and stored, such as by memory 26. Alternatively, the combination lock code may be determined concurrent with or subsequent to receipt of user input in the form of rotation of the multi-function physical dial 14.

As shown in block 32 of FIG. 3, the apparatus 20 may also include means, such as the processor 22, the user interface 24, the multi-function physical dial 14 or the like, for receiving input indicative of rotation of the multi-function physical dial carried by the communication device 10. For example, the apparatus, such as the processor, may receive input indicative of the different positions at which rotation of the multi-function physical dial is halted. While the input indicative of the different positions at which the rotation of the multi-function physical dial is halted may be represented in various manners, the multi-function physical dial of an example embodiment may include a plurality of demarcations, such as demarcations identified as 1, 2, . . . 11, 12, spaced evenly about the circumference of the multi-function physical dial in a comparable manner to the hours upon a clock face. Thus, the input that is received may be indicative of the location upon the multi-function physical dial that is aligned with a predefined reference point 16, such as may be defined by the housing of the communication device, at which rotation of the multi-function physical dial is halted. For example, the apparatus may receive input indicative of rotation of the multi-function physical dial being initially halted at 2, prior to further rotation and halting at 7, and prior to even further rotation and halting at 4. The locations at which the rotation of multi-function physical dial is halted may, in turn, be combined so as to comprise the input, e.g., 2 7 4 in the forgoing example.

By utilizing a multi-function physical dial 14, the user of the communication device 10 may intuitively understand the manner in which the input is to be provided. In addition, rotation of the multi-function physical dial may be required to overcome resistance which serves to avoid accidental changes in the position of the multi-function physical dial and to provide tactile feedback to the user during rotation of the multi-function physical dial. The multi-function physical dial may be configured to provide a desired level of force in conjunction with the rotation of the physical dial. The rotation of the multi-function physical dial may also have inertia associated therewith. The inertia smooths the user input, suppresses relatively small levels of shaking, allows fine-tuning of the rotational position of the physical dial at low speeds and facilitates turning of the physical dial at high speeds. As such, the user is able to appropriately rotate and stop the multi-function physical dial in a manner that increases the accuracy with which the user provides the input via the multi-function physical dial, such as relative to a software dial that provides no physical feedback regarding its rotation.

Following receipt of the input via the multi-function physical dial 14, the apparatus 20 may also include means, such as the processor 22 or the like, for determining whether the input corresponds to the combination lock code. See decision block 34 of FIG. 3. For example, the apparatus, such as the processor or the like, may be configured to compare the input received as a result of rotation of the multi-function physical dial to the combination lock code associated with a predefined security level. In instances in which the communication device 10 has multiple predefined security levels with different respective combination lock codes, the apparatus, such as the processor or the like, may be configured to compare the input to each of the combination lock codes associated with the respective predefined security levels.

As shown in block 36 of FIG. 3, in an instance in which the input does correspond to a respective combination lock code, such as in an instance in which the input equals the respective combination lock code, the apparatus 20 may also include means, such as the processor 22 or the like, for permitting access to the communication device 10 in a manner consistent with the predefined security level associated with the combination lock code to which the input corresponds. The access that is permitted as a result of the satisfaction of a predefined security level may vary depending upon the configuration of the communication device and the particular security level that is satisfied.

In an example embodiment, however, in which a predefined security level is defined for advanced users, such as administrators or programmers, relative to novice users of a communication device 10, the access that is permitted to an advanced user once the predefined security level has been satisfied may include the apparatus 20, such as the processor 22, the memory 26 or the like, being configured to permit an application written using an application programming interface (API) or software development kit (SDK) of the communication device to be uploaded to the communication device. Once uploaded, the application may modify the functionality provided by the communication device. In this example, it may be undesirable for a novice user to be allowed to modify the functionality provided by the communication device, but it may be permissible for a more experienced or advanced user to upload such an application in order to modify the performance of the communication device, thereby tailoring or otherwise enhancing the functionality provided by the communication device. The combination lock code may therefore be provided to an advanced user, but not a novice user, such that the communication device is protected from inadvertent or malicious efforts to disadvantageously alter its performance, such as by a novice user, by requiring satisfaction of the predefined security level with the combination lock code prior to permitting a user access to upload an application written using an API or SDK of the communication device.

Additionally, it is noted that the apparatus 20 and, as such, communication device 10 need not be communicably connected to a network, such as cloud computing resources, in order to receive the input and to determine whether the input corresponds to the combination lock code in order to selectively permit access to the communication device in a manner consistent with the predefined security level. Instead, the apparatus and, as such, communication device may be configured to make such a determination in an offline manner, that is, while the communication device is disconnected from a network, such as a cellular network, a wireless local area network (WLAN) or the like. In this regard, the communication device may be capable of being alternately communicably connected to or disconnected from the network, such as via the communication interface 28 of FIG. 2. As noted above, the apparatus, such as the processor 22 or the like, may be configured to determine whether the input corresponds to the combination lock code while the communication device is communicably disconnected from the network. As such, a user may provide input in the form of a combination lock code so as to satisfy a predefined security level and gain access to otherwise restricted aspects of the communication device even in an instance in which the communication device is offline or otherwise without a network connection, thereby increasing the flexibility with which a user may gain secure access to the communication device.

As noted above, the dial via which the user inputs the combination lock code is a multi-function physical dial 14 that may be utilized by the user to provide input in other instances, such as in conjunction with user interaction with other applications. As such, the apparatus 20 of an example embodiment may also include means, such as the processor 22 or the like, for causing another function, that is, a function other than that permitted by satisfaction of the predefined security level, to be performed by the communication device 10 based upon the input in an instance in which the input fails to correspond to the combination lock code. See block 38 of FIG. 3. As such, in the instance in which the apparatus, such as the processor or the like, determines that input provided via the multi-function physical dial does not correspond to the combination lock code, the apparatus, such as the processor or the like, may be configured to interpret the input in a different manner, such as by interpreting the input as input to the application currently be executed by the communication device, thereby causing a different function to be performed instead of the function(s) otherwise permitted by satisfaction of the predefined security level. By configuring the physical dial to have multiple functions, the physical configuration of the communication device need not be modified in order to receive user input that may be utilized for security purposes.

The apparatus 20, such as a processor 22 or the like, may be configured to receive the input indicative of rotation of the multi-function physical dial 14 and to then interpret the input based upon whether or not the input corresponds to a combination lock code as described above in conjunction with the blocks 36 and 38 of FIG. 3. Alternatively, an initial input may be provided by the user prior to the rotation of the multi-function physical dial that provides an indication as to whether the subsequent input indicative of rotation of the multi-function physical dial is to be compared to the combination lock code for security purposes or is to be considered as input for other purposes, such as input in conjunction with another application of the communication device 10. In this regard, the initial input may be provided in various manners including via the user interface 24.

As shown in block 40 of FIG. 3, the apparatus 20 of an example embodiment may also include means, such as the processor 22, the user interface 24, the display 12 or the like for causing information regarding the combination lock code to be displayed. A variety of information may be displayed at different points in the process. For example, the apparatus may be configured to cause each digit of the user input to be presented as the user provides the input, thereby providing additional feedback and permitting the user to verify the accuracy of the input. Additionally or alternatively, the apparatus may be configured to provide information following receipt of the input and following comparison of the input to a combination lock code with the information identifying whether or not the input matched a combination lock code and, if so, the predefined security level that the user is now able to access and/or the privileges associated with the predefined security level.

As noted above, the communication device 10 may be configured in various manners including as a mobile terminal as shown in FIG. 1 and discussed above. Alternatively, the communication device may be a fixed computing device, such as a personal computer, a desktop computer, a computer workstation or the like. Alternatively, the communication device may be a different type of mobile terminal, such as camera 50 or other image capture device as shown, for example, in FIG. 4. In this example embodiment, the camera includes a lens 52 and one or more control inputs 54. The camera may be configured to capture images, including still images, videos or the like. In addition, the camera may be configured to be communicably connected to a network so as to, for example, upload the images.

Additionally, the camera 50 may include a multi-function physical dial 56. In the illustrated embodiment, the multi-function physical dial is disposed circumferentially above the lens 52 and proximate the housing of the camera. The multi-function physical dial may be configured to rotate relative to the housing, such as in clockwise, counterclockwise or both counterclockwise and clockwise directions. As such, input may be provided via the multi-function physical dial that may, in turn, be compared to a combination lock code associated with a predefined security level to determine if the user is to be permitted access to the camera in a manner consistent with the predefined security level as described above. However, rotation of the multi-function physical dial of the camera in FIG. 4 may also provide other types of input, such as input that changes the settings of the camera including, for example, the focus, aperture, shutter speed, international standards organization (ISO), step zoom, exposure compensation, aspect ratio, i-Contrast and/or white balance. As such, the physical configuration of the communication device, such as the camera, need not be modified in order facilitate the receipt of user input that may be utilized for security purposes via the multi-function physical dial in accordance with an example embodiment of the present invention.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   associating a combination lock code with a predefined security level for a communication device;
   receiving input indicative of rotation of a multi-function physical dial carried by the communication device;
   determining, with a processor, whether the input corresponds to the combination lock code; and in an instance in which the input corresponds to the combination lock code, permitting access to the communication device in a manner consistent with the predefined security level, wherein permitting access to the communication device comprises permitting an application written using an application programming interface (API) or a software development kit (SDK) of the communication device to be uploaded to the communication device.

2. A method according to claim 1 wherein, in an instance in which the input fails to correspond to the combination lock code, causing another function to be performed by the communication device based upon the input.

3. A method according to claim 1 wherein associating the combination lock code with a predefined security level comprises determining the combination lock code based upon a predefined identifier associated with the communication device.

4. A method according to claim 3 wherein determining the combination lock code comprises mapping the predefined identifier to the combination lock code with a hash function.

5. A method according to claim 1 wherein the communication device is capable of being alternately communicably connected to or disconnected from a network, and wherein determining whether the input corresponds to the combination lock code is performed while the communication device is communicably disconnected from the network.

6. A method according to claim 1 further comprising causing information regarding the combination lock code to be displayed.

7. An apparatus comprising at least one processor and at least one memory including computer program code, the at least one memory and the computer program code configured to, with the processor, cause the apparatus to at least:
associate a combination lock code with a predefined security level for a communication device;
receive input indicative of rotation of a multi-function physical dial carried by the communication device;
determine whether the input corresponds to the combination lock code; and
in an instance in which the input corresponds to the combination lock code, permit access to the communication device in a manner consistent with the predefined security level,
wherein the at least one memory and the computer program code are configured to, with the processor, cause the apparatus to permit access to the communication device by permitting an application written using an application programming interface (API) or a software development kit (SDK) of the communication device to be uploaded to the communication device.

8. An apparatus according to claim 7 wherein the at least one memory and the computer program code further configured to, with the processor, cause the apparatus to cause another function to be performed by the communication device based upon the input in an instance in which the input fails to correspond to the combination lock code.

9. An apparatus according to claim 7 wherein the at least one memory and the computer program code are configured to, with the processor, cause the apparatus to associate the combination lock code with a predefined security level by determining the combination lock code based upon a predefined identifier associated with the communication device.

10. An apparatus according to claim 9 wherein the at least one memory and the computer program code are configured to, with the processor, cause the apparatus to determine the combination lock code by mapping the predefined identifier to the combination lock code with a hash function.

11. An apparatus according to claim 7 wherein the communication device is capable of being alternately communicably connected to or disconnected from a network, and wherein the at least one memory and the computer program code are configured to, with the processor, cause the apparatus to determine whether the input corresponds to the combination lock code while the communication device is communicably disconnected from the network.

12. An apparatus according to claim 7 wherein the at least one memory and the computer program code are further configured to, with the processor, cause the apparatus to cause information regarding the combination lock code to be displayed.

13. A computer program product comprising at least one non-transitory computer-readable storage medium having computer-executable program code portions stored therein, the computer-executable program code portions comprising program code instructions for:
associating a combination lock code with a predefined security level for a communication device;
receiving input indicative of rotation of a multi-function physical dial carried by the communication device;
determining whether the input corresponds to the combination lock code; and
in an instance in which the input corresponds to the combination lock code, permitting access to the communication device in a manner consistent with the predefined security level,
wherein the program code instructions for permitting access to the communication device comprise program code instructions for permitting an application written using an application programming interface (API) or a software development kit (SDK) of the communication device to be uploaded to the communication device.

14. A computer program product according to claim 13 wherein the computer-executable program code portions further comprise program code instructions for, in an instance in which the input fails to correspond to the combination lock code, causing another function to be performed by the communication device based upon the input.

15. A computer program product according to claim 13 wherein the program code instructions for associating the combination lock code with a predefined security level comprise program code instructions for determining the combination lock code based upon a predefined identifier associated with the communication device.

16. A computer program product according to claim 15 wherein the program code instructions for determining the combination lock code comprise program code instructions for mapping the predefined identifier to the combination lock code with a hash function.

17. A computer program product according to claim 13 wherein the communication device is capable of being alternately communicably connected to or disconnected from a network, and wherein the program code instructions for determining whether the input corresponds to the combination lock code are configured to execute while the communication device is communicably disconnected from the network.

18. A method according to claim 3 wherein the predefined identifier associated with the communication device comprises an international mobile equipment identity (IMEI) associated with the communication device.

19. An apparatus according to claim 9 wherein the predefined identifier associated with the communication device comprises an international mobile equipment identity (IMEI) associated with the communication device.

20. A computer program product according to claim 15 wherein the predefined identifier associated with the communication device comprises an international mobile equipment identity (IMEI) associated with the communication device.

* * * * *